Nov. 6, 1962

CY M. PEARCE 3,062,563

LEVEL LOAD TRAILER

Filed Nov. 13, 1961

INVENTOR
Cy M. Pearce

BY Webster & Webster
ATTORNEYS

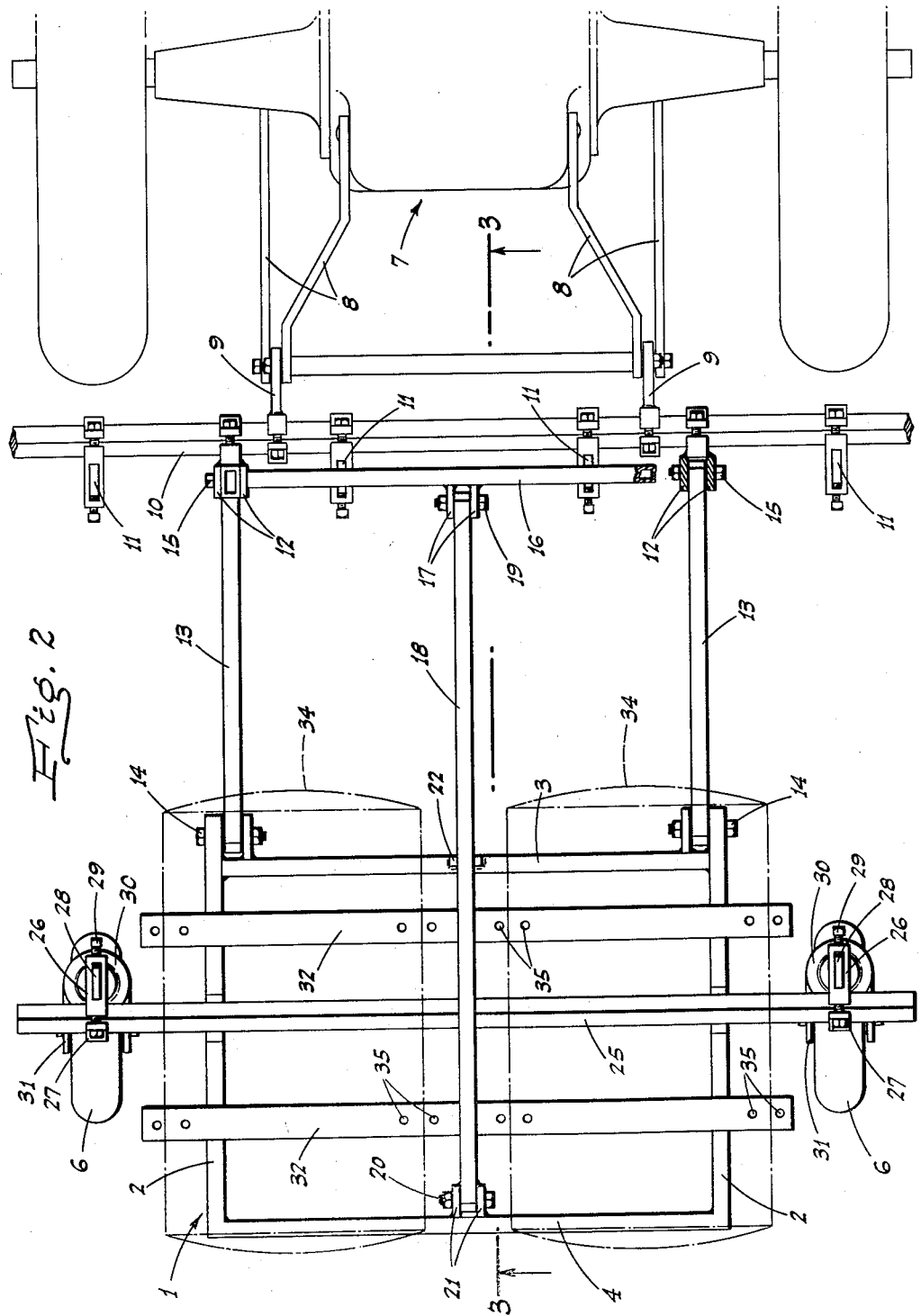

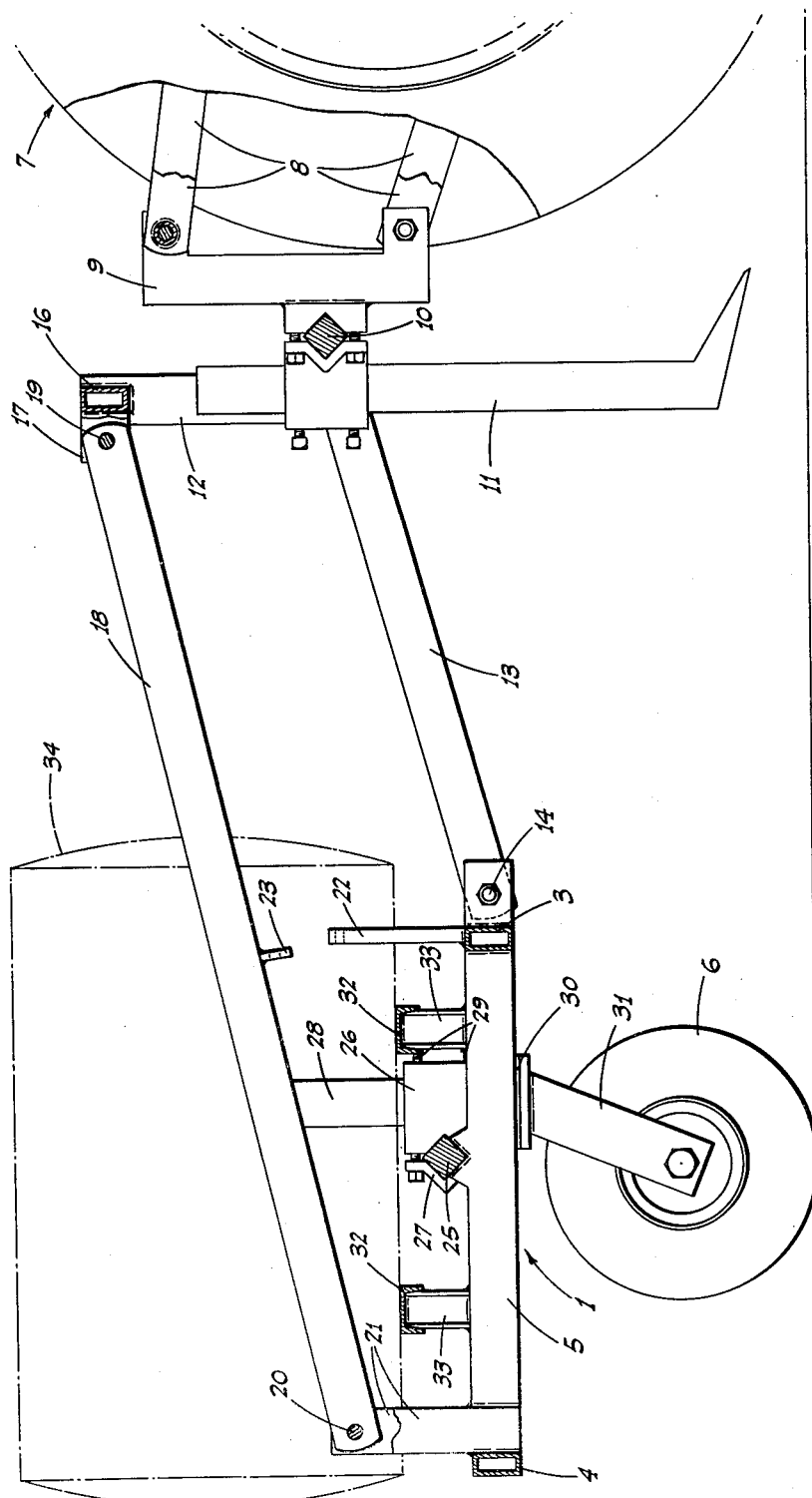

United States Patent Office 3,062,563
Patented Nov. 6, 1962

3,062,563
LEVEL LOAD TRAILER
Cy M. Pearce, Arvin, Calif., assignor to Brown & Bryant, Inc., Shafter, Calif., a corporation of California
Filed Nov. 13, 1961, Ser. No. 151,782
3 Claims. (Cl. 280—461)

This invention relates to trailers designed for draft connection to the vertically adjustable tool bar on a tractor; the major object being to provide a two-wheel trailer having a draft and stabilizing structure arranged for operative connection to the tool bar in such a manner that the trailer will remain horizontally level and ground-supported at all times as the tractor moves along the ground, and irrespective of whether the tool bar and the tools supported thereby are in a lowered position or are raised so that the tools clear the ground.

Selectively operable means is also provided, however, which enables the trailer to be lifted clear of the ground, as the tool bar is lifted, while still maintaining the trailer on a horizontal level.

Another object of the invention is to provide the trailer with caster wheels so that the trailer, which is rigid with the tractor in a lateral direction, will easily swing with the tractor as the latter is steered, without any drag on the wheels and without raising the wheels from the ground. Also, said wheels are mounted so that they may be raised or lowered relative to the body of the trailer, and their gauge independently altered to correspond to the gauge of the tractor wheels should such gauge be altered at any time, as is somewhat desired.

A further object of the invention is to provide a practical, reliable, and durable level load trailer, and one which will be exceedingly effective for the purpose for which it is designed.

These objects are accomplished by means of such structure and relative arrangement of parts as will fully appear by a perusal of the following specification and claims.

In the drawings:

FIG. 2 is a plan view of the trailer.

FIG. 3 is a sectional elevation of the trailer taken on line 3—3 of FIG. 2, showing the tool bar raised to clear the tools from the ground, but with the wheels of the trailer still in ground engagement.

Figure 1:
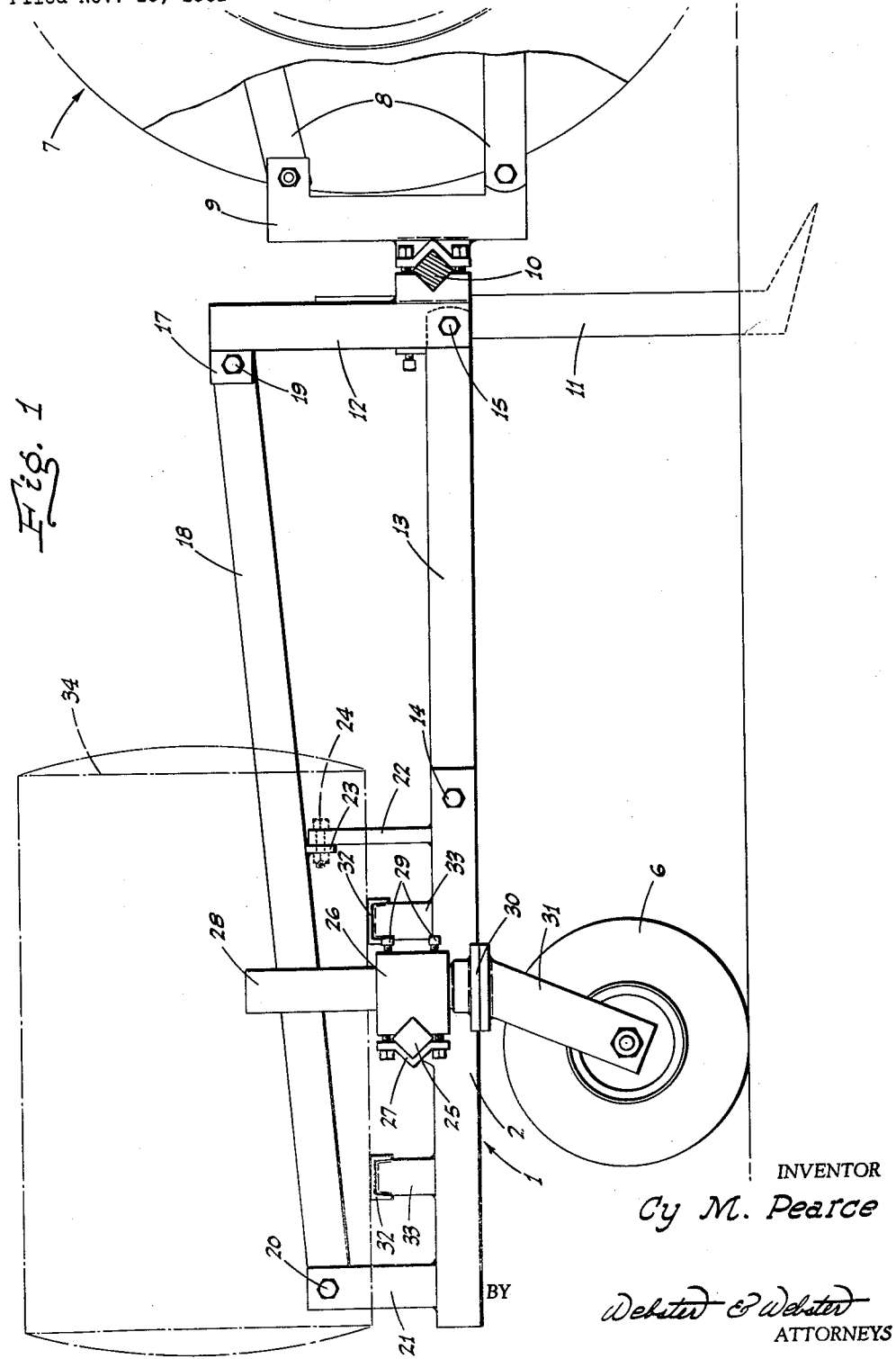
FIG. 1 is a side elevation of the trailer as connected in draft relation with the tool bar of a tractor, and with the trailer wheels in ground engagement, and the tool bar lowered to place the tools in the ground.

Referring now more particularly to the drawings, and to the characters of reference marked thereon, the trailer comprises a rectangular horizontal frame, indicated generally at 1, and which frame includes side beams 2, front and rear transverse beams 3 and 4 respectively, and a central longitudinal beam 5 extending between the transverse beams 3 and 4. A single pair of wheels 6, mounted in a particular manner as will be later described, supports the frame 1 intermediate its ends from the ground.

The tractor, indicated generally at 7, to which the trailer is adapted to be connected, is provided with the customary pairs of draft and lift links 8. The vertically spaced links on each side of the tractor are connected together at their ends in pivotal relation by a vertical arm 9, the two arms together supporting a rigid tool bar 10 on their rear face in the customary manner, and from which bar suitable ground working tools 11 depend.

The trailer is connected to this tool bar, so that the main object of the invention may be attained, by means of the structure and arrangement of parts now to be described.

Vertical standard units 12 are rigidly clamped to and project upwardly from the tool bar 10 on the rear side thereof, said units being spaced apart substantially the same distance as the spacing between the side beams 2 of the trailer frame. Extending between each beam 2 and the related standard unit 12 is a draft link 13, of combined tension and compression form; this link being generally horizontal when the tool bar is in a lowered position as shown in FIG. 1, and being pivoted at its rear end on beam 2 at the forward end thereof, as shown at 14, and at its forward end to the standard unit 12 at the lower end thereof, as indicated at 15.

A rigid cross bar 16 connects the standard units 12 at their upper ends; said bar being provided—centrally of its ends, or in alinement with the central intermediate beam 5 of the trailer frame—with a rearwardly projecting clevis 17. A stabilizing bar 18 is pivoted at its forward end on the clevis 17, as at 19, and extends thence at a downward slope relative to the frame 1 to a pivotal connection 20 at its rear end with the upper end of a rigid elongated clevis 21 projecting upwardly from beam 5 of the trailer frame at the rear end thereof.

By reason of the above arrangement of parts, it will be seen that the trailer frame 1 will be maintained on a constant level whether the tool bar is in a lowered position, as shown in FIG. 1, or is raised to lift the tools 11 clear of the ground, as shown in FIG. 3; the trailer wheels 6 in both cases remaining in trailer supporting contact with the ground so that the weight and load of the trailer is not taken by the lift links 8 and their control mechanism.

However, in order to enable the trailer to be lifted so that the wheels thereof will clear the ground when desired, as when the trailer is light and free of any load, the following simple arrangement is provided:

Rigid with and upstanding from the forward cross beam 3 of the trailer directly under the bar 18 is an arm 22 which terminates short of said bar 18. A lug 23 depends from the under side of bar 18 in position to overlap the arm 22 on one side and at the upper end thereof when the tool bar 10 is in its lowered position, as shown in FIG. 1. The arm and lug may then be releasably bolted together, as indicated at 24.

With this arrangement it will be seen that the bar 18 and the trailer frame 1 will be then rigidly connected together as a unit, while the draft links 13 are free to swivel and then act as compression members. Therefore, as the tool bar and the parts connected thereto are lifted, the trailer will likewise be lifted to clear the wheels 6 from the ground.

The wheels 6 are mounted on the trailer 1 in the following manner:

Secured on and extending across the beams 2 and 5 substantially midway of the length of the frame 1 is a transverse beam 25, which projects some distance laterally out from the side beams 2, as shown in FIG. 2. Slidably engaging said beam 25 on one side thereof and laterally out from the frame 1 are vertical sleeves 26, adjustably secured to said beam by suitable clamps 27 of conventional character. Standards 28 are slidable through the sleeves, being held in any desired position of adjustment therein by set screws 29 or the like. Each standard 28 at its lower end supports a horizontally swivel mount 30 for the supporting yoke 31 of the adjacent wheel 6.

By reason of the structure above described, it will be seen that the wheels 6 may be adjusted vertically relative to the frame 1, and may be independently adjusted laterally relative to each other and to the frame 1, as the setting of the tractor wheels may call for in order that the wheels of the tractor and trailer shall track with each other.

In order to support a load on the trailer, transverse beams 32 extend across said frame 1 on opposite sides of the beam 25, and preferably supported at a level above that of said beam 25 by feet 33 upstanding from the longitudinal beams of the frame 1. The load in the present instance is indicated as being a pair of cylindrical horizontally disposed tanks 34, one on each side of the stabilizing beam 18, so as not to interfere with the movement thereof as the tool bar 10 is moved up and down.

Such tanks would be adapted to contain liquid fertilizer for discharge into the ground behind the tools 11, as is customarily done. The beams 32 may be provided with bolt holes 35 therethrough at convenient points therealong, so that the load tanks or other receptacles and forms of load may be bolted or strapped to said beams 32.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired.

What is claimed is:

1. A trailer for connection in draft relation to a tractor having a transverse vertically movable member at its rear end, the trailer comprising a horizontal frame, a single pair of transversely spaced wheels supporting the frame, a draft link extending between and pivoted to the frame at its forward end and to the tractor member, a stabilizing bar extending between said member and the trailer, means pivoting the bar at its rear end on the trailer frame rearwardly of the forward end thereof, means pivotally supporting the bar at its forward end from said member at a point above the point of connection of the draft link therewith, and means separate from the bar pivoting means to releasably and rigidly connect the bar to the trailer frame.

2. A trailer, as in claim 1, in which said separate means comprising an arm rigid with and upstanding from the frame ahead of the rear pivoted end thereof, and a lug rigid with and depending in position to lap one side of the arm when the tractor member is in a lowered position; said arm and lug, when in such lapping position, being adapted to be releasably connected together whereby when said member is raised, the trailer will be raised therewith; the draft link being a combined tension and compression element.

3. A trailer for connection in draft relation to a tractor having a transverse vertically movable member at its rear end, the trailer comprising a horizontal frame, a single pair of transversely spaced wheels supporting the frame, standards secured to and upstanding from the member at transversely spaced points thereon, combined tension and compression draft links extending between and transversely pivoted at their rear ends to the frame at its forward end and at their forward ends to the standards at the lower ends thereof, a longitudinal stabilizing bar extending forwardly from the rear end of the frame at an upward slope, means transversely pivoting the bar at its rear end in connection with the trailer frame adjacent the rear end thereof, and means transversely pivoting the bar at its forward end in connection with the standards at a level adjacent the upper ends thereof.

References Cited in the file of this patent

UNITED STATES PATENTS

| | | |
|---|---|---|
| 1,491,097 | Hoffman | Apr. 22, 1924 |
| 1,794,630 | Linn | Mar. 3, 1931 |
| 1,916,945 | Ferguson | July 4, 1933 |
| 2,179,586 | Carpenter | Nov. 14, 1939 |
| 2,393,358 | Ferguson | Jan. 22, 1946 |
| 2,394,210 | Sherman | Feb. 5, 1946 |
| 2,563,372 | Risse | Aug. 7, 1951 |
| 2,596,390 | Essick | May 13, 1952 |
| 2,712,358 | Kuhary | July 5, 1955 |

FOREIGN PATENTS

| | | |
|---|---|---|
| 609,015 | Canada | Nov. 22, 1960 |